United States Patent [19]

Reiners

[11] 4,325,882

[45] Apr. 20, 1982

[54] EXTRACTION OF OIL FROM HIGH OIL-BEARING SEED MATERIALS

[75] Inventor: Robert A. Reiners, Hinsdale, Ill.

[73] Assignee: CPC International Inc., Englewood Cliffs, N.J.

[21] Appl. No.: 219,742

[22] Filed: Dec. 23, 1980

[51] Int. Cl.³ .......................... A23J 1/14; C11B 1/10
[52] U.S. Cl. ................................................ 260/412.4
[58] Field of Search ...................................... 260/412.4

[56] References Cited

U.S. PATENT DOCUMENTS 2,605,271 7/1952 Hunn et al. .
2,645,650 7/1953 Ayers et al. .
4,008,210 2/1977 Steele et al. .
4,255,346 3/1981 Kock ................................ 260/412.4

FOREIGN PATENT DOCUMENTS 2722245 11/1978 Fed. Rep. of Germany .
1184345 3/1970 United Kingdom .

OTHER PUBLICATIONS

Neshchadim et al., "Rapid Direct Extraction of Oil from Untreated Crushed Kernels of Oil-Bearing Seeds", Masloboino-Zhir. Prom 35 (#11), pp. 8-11 (1969).

*Primary Examiner*—John F. Niebling
*Attorney, Agent, or Firm*—Stanley M. Parmerter

[57] ABSTRACT

A process is provided for the extraction of oil from high-oil bearing seed materials. This process employs total immersion of a moist solid in a solvent without production of emulsions or contamination of the miscella with finely-divided solids.

5 Claims, No Drawings

EXTRACTION OF OIL FROM HIGH OIL-BEARING SEED MATERIALS

FIELD OF THE INVENTION

This invention relates to a total immersion process for the extraction of oil from high oil-bearing seed materials.

BACKGROUND OF THE INVENTION

There are numerous known methods for recovering oil from vegetable materials. One technique in commercial use involves continuously pressing the vegetable material at low moisture content to expel oil. A pretreatment steaming of the vegetable material is frequently employed to facilitate the pressing separation.

Although mechanical pressing is a relatively simple procedure, it removes only part of the oil from the vegetable material. For this reason, a combination of continuous screw pressing followed by solvent extraction of the pressed meal is frequently employed on high oil-content seed materials, i.e., those containing more than 25% oil.

One disadvantage of the prepressing-solvent extraction technique for processing high oil-content materials is the high cost of the equipment. Not only must continuous screw presses be purchased and maintained but also a full-scale solvent extractor must be installed. Furthermore, it is usually necessary to flake the pressed cake to give particles that will hold together during solvent extraction, adding expense to the process.

An additional problem with the prepressing-solvent extraction technique relates to oil quality. That oil which remains in the pressed cake has been exposed to the air while at elevated temperatures. As a result, the oil extracted from the pressed cake is dark colored and difficult to refine to a light colored oil.

For the foregoing reasons, direct solvent extraction processes without mechanical pressing have been investigated. These processes are of two main types. One may be called a "percolation" process, wherein a basket or other liquid-permeable container is filled with the vegetable material and the extraction liquid is passed through it. Such containers are usually stacked in a vertical tower, with the solvent percolating downwards successively through each container in the stack and with the material acting as a self-filtering medium. Complete extraction of the oil by this process is difficult if the solid material becomes soggy and tends to pack, preventing a uniform permeation of the vegetable material by the solvent. In addition, if the solid to be extracted contains any appreciable amount of fine material, the fines may wash through with the solvent and contaminate the oil. The percolation process is also time-consuming since the solid must be contacted with solvent for long periods of time to obtain complete oil extraction.

A second type of extraction process may be characterized as a total immersion process. In such a process, the vegetable material is completely submerged in the extraction solvent. Oil is extracted more rapidly by this process. However, in order for such a process to be successful, the vegetable material must be finely divided and the solid must be agitated in order to provide good contact between the solid and the solvent. Such a process has heretofore been relatively unsatisfactory because appreciable amounts of finely-divided material have tended to remain in the miscella and thus be carried away by the miscella leaving the extraction unit. The crude oil must then be filtered before it can be further processed. The fines tend to clog the filters making their removal a difficult and expensive step.

We have now discovered a total immersion process which avoids the cost and problems of the expelling-extraction process and does not produce fines in the miscella. It is particularly suitable for the extraction of oil from high oil-bearing seeds, i.e., those containing more than 25% oil, from which oil is usually obtained by the expelling-extraction procedure.

SUMMARY OF THE INVENTION

Briefly, in accordance with this invention, a process is provided whereby finely-divided high oil-bearing seeds, containing from about 10% to about 25% water by weight, are dispersed in an oil solvent to give a solid-solvent dispersion. The oil is extracted from the solid-solvent dispersion with more oil solvent. Finally, the oil-containing solvent is separated from the insoluble material, and the oil is recovered from the oil-containing solvent.

DESCRIPTION OF PREFERRED EMBODIMENTS

The process of this invention can be applied to various oil-bearing vegetable materials of relatively high oil content. It is particularly suitable to high oil-bearing seeds and as kernels of the babassu nut, flaxseed, peanuts, rapeseed, sesame seeds and sunflower seeds.

In the practice of this invention, vegetable material, which has been cleaned to remove dirt and chaff, is milled either before or after being mixed with water to bring it to the desired moisture content. In any event, it is necessary to bring the vegetable material to a moisture content of from about 10% to about 25%, preferably about 15% to about 20%, water by weight before the extraction operation is carried out. It has been discovered that if the finely-divided material contains this amount of water, the solid can be separated from the miscella without contaminating the miscella with fines. If the finely-divided solid contains lesser amounts of water, the miscella is cloudy due to the presence of finely-divided solid.

Milling of the vegetable material is accomplished by any conventional means for reducing the size of particles. A convenient laboratory mill suitable for this purpose is a micropulverizer, type SH, stainless steel hammer mill, made by Pulverizing Machinery Company, Summit, N.J. Another mill suitable for larger-scale operation is the Urschel COMITROL (Urschel Laboratories Company, Valparaiso, Ind.). This may be fitted with various heads to give varying degrees of comminution of the vegetable material. In general, the material to be extracted should be ground to such a size that the oil can be readily extracted from it. It is desirable that the residual meal after extraction contains less than about 5% oil, preferably less than 2% oil. The degree of grinding necessary will vary somewhat with the vegetable material, but in general it should be so finely divided that at least about 50% will pass through a No. 100 U.S. sieve.

The ground material, adjusted to the proper moisture content, is next mixed with an oil solvent. Typically, the oil solvent is a liquid hydrocarbon such as hexane. Mixing is accomplished by any means that provides intimate contact between the solid and solvent. Circulation through a colloid mill, a homogenizer or even a centrifugal pump may be used to perform this step. In the laboratory, it is convenient to perform the mixing in a Waring Blender.

The mixture of liquid extract and suspended solid matter is next separated. This may be achieved by filtration or centrifugation. If a centrifuge is used, it is desirable to choose operating conditions so that the water present is retained in the solid and is not squeezed out to form a separate liquid layer. In the laboratory, this is conveniently accomplished by bringing the centrifuge up to about 500–800×g before the motor is turned off.

The separated solid is redispersed in fresh solvent, with further particle size reduction if necessary, and the separation step is repeated. These dispersion and separation steps are repeated as many times as necessary to complete the oil extraction. Extraction may be carried out with the solvent at room temperature or at higher temperatures if desired.

Economical large-scale extractions and separations can be carried out as a continuous process by passing this slurry through hydrocyclones. The oil solvent is passed countercurrently through the same system. A typical arrangement for a hydrocyclone countercurrent washing system is disclosed in U.S. Pat. No. 2,840,524. Alternatively, a solid-bowl, scroll-discharge centrifuge can be used to carry out the separations in a continuous manner.

After extraction has been completed, the residual vegetable material will generally exhibit an oil content of less than 5%, preferably less than about 2%, by weight. This material, which often has a high protein content, may be freed of solvent by evaporation and used as a food product or an animal feed. Since it has not been subjected to the high temperatures of an expelling process, the protein is not denatured and is of high quality, a further advantage of this procedure.

The oil is separated from the solvent using conventional equipment. The oil may be further treated as desired using any one, or a combination, of the customary steps of refining, bleaching and deodorizing to produce a high-grade vegetable oil. A further advantage of this process over the prepressing-solvent extraction processes frequently used for extracting oil from high oil-bearing seeds is that the oil has not been exposed to the air while at the elevated temperatures attained in a screw press. As a result, the oil extracted by this method is not dark colored and is much more readily refined than the oil extracted from a pressed cake.

Although the foregoing process has been described chiefly in terms of a complete process for extracting the oil from essentially naturally occurring forms of vegetable material, it is not so limited. This process may be used in combination with other conventional steps in oil extraction and by-product recovery.

Throughout the present process and in any preliminary steps or treatment of vegetable material, it is preferable that conditions deleterious to the oil in the vegetable material be minimized or avoided. Of these conditions, elevated temperatures are the most serious. Such temperatures, unless for a very brief time, can cause the quality of the oil to suffer. In view of this, it is generally desirable to maintain moderate temperatures, to limit exposure to elevated temperatures to a short time as possible and to maintain an inert atmosphere throughout the processing of the vegetable material and its oil.

The following examples illustrate certain embodiments of the present invention. Unless otherwise stated, all proportions and percentages are provided on the basis of weight.

EXAMPLE 1

Extraction of Oil from Various Seeds

The vegetable material to be extracted was ground in a 12.7-cm diameter micropulverizer, type SH, stainless steel hammer mill, made by Pulverizing Machinery Company, Summit, N.J., operated at about 8800 rpm. The vegetable material was ground to pass through a screen of the desired diameter and the ground material was hydrated to the desired moisture content. The hydrated seed was then extracted 7 times with hexane. Milling and extraction conditions are given in Tables I–IV.

The solid and miscella were separated in an International No. 2 centrifuge, manufactured by the International Equipment Company, Boston, Mass. The centrifuge was brought to 1500–2000 rpm (500–800×g) before the motor was turned off. The extract was then decanted from the solid before the solid was reextracted.

Residual oil was determined by the Spex mill method to indicate the completeness of oil extraction. In this method, the sample is placed with carbon tetrachloride in a small ball mill (Spex mixer mill, Catalog No. 8000) made by Spex Industries, Inc., Metuchen, N.J., and shaken thoroughly to disintegrate the meal. The ground slurry is heated for 30 minutes under reflux with carbon tetrachloride and filtered. The oil content of the filtrate is determined after evaporation of the solvent.

Results from the extraction of sunflower seeds, rapeseed (Canola seed), flaxseed, and sesame seeds are given in Table I–IV. These results show that the process of this invention gives clear miscella when the moisture content of the finely-divided seeds is from about 14.2% to about 27.2%. Comparative tests run with milled seeds containing from 6 to 9% moisture gave cloudy miscella due to the presence of finely-divided solids. These results also show that good oil extraction is possible by this procedure.

TABLE I

EXTRACTION OF SUNFLOWER SEEDS

| Screen Size, mm[a] | Moisture Adjusted to, %[b] | Extraction Conditions[c] | Miscella Clarity | Residual Oil, % d.b. |
|---|---|---|---|---|
| 7.9 | 17.3 | Regular | Clear | 3.9 |
| 7.9 | 17.3 | Regular + Waring Blendor | Clear | 1.3 |
| 7.9 | 15.0 | Regular | Clear | 3.5 |
| 7.9 | 15.0 | Regular + Waring Blendor | Clear | 1.3 |
| 3.2 | 14.2 | Regular | Clear | 3.0 |
| 3.2 | 14.2 | Regular + Waring Blendor | Clear | 1.1 |

[a] Cleaned sunflower seed (4.8% moisture) was passed through a 12.7-cm stainless steel hammer mill fitted with indicated screen.
[b] Ground seed brought to indicated moisture by spraying water onto ground seed while mixing. Allowed to equilibrate by standing for >30 minutes at room temperature.
[c] For the "regular" extraction, mixed 30 grams ground seed with 75 ml hexane for 30 seconds at low speed in 1-pint Waring Blendor. Separated by centrifuging at 1500 rpm (500 × g) for 1 second. Redispersed residue in Waring Blendor as above and separated again. Extracted 5 more times by shaking centrifugal residue into 75 ml hexane. "Waring Blendor" indicates an eight extraction was carried out in a 1-pint Waring Blendor at high speed for 1 minute.

TABLE II

| Moisture Adjusted to, %[a] | Extraction Conditions[b] | Miscella Clarity | Residual Oil, % d.b. |
|---|---|---|---|
| 11.6 | Regular + Waring Blendor | Slightly Cloudy | 3.8 |
| 15.9 | Regular + Waring Blendor | Clear | 3.4 |
| 18.6 | Regular + Waring Blendor | Clear | 3.9 |
| 15.4 | Regular | Very Slightly Cloudy | 15.3 |
| 15.4 | Regular + Waring Blendor[c] | Very Slightly Cloudy | 1.9 |

[a]Regent Canola seed (46.4% oil) ground through stainless steel hammer mill fitted with 3.2-mm screen. Moisture added after grinding; sample stored 16+ hours at 4° C. to equilibrate.
[b]"Regular" indicates that sample was ground for 1 minute at high speed in 1-quart Waring Blendor before first extraction, not ground in subsequent 6 extractions. "Waring Blendor" indicates sample ground 1 minute at high speed before each extraction. Centrifuged at 800 × g for 1 second to separate miscella.
[c]Ground total of 19 minutes at high speed in Waring Blendor during the 7 extractions.

TABLE III
EXTRACTION OF FLAXSEED

| Moisture Adjusted to, %[a] | Extraction Conditions[b] | Miscella Clarity | Residual Oil, % d.b. |
|---|---|---|---|
| 14.8 | Regular | Clear | 11.5 |
| 14.8 | Regular + Waring Blendor | Clear | 4.2 |
| 18.3 | Regular + Waring Blendor | Clear | 5.0 |
| 21.3 | Regular + Waring Blendor | Clear | 5.4 |

[a]Commercial flaxseed (39.3% oil, d.b.) ground through hammer mill fitted with 3.2-mm screen. Moisture added after grinding; sample stored 16+ hours at 4° C. to equilibrate.
[b]"Regular" indicates that sample was ground for 1 minute at high speed in 1-quart Waring Blendor before first extraction, not ground in 6 subsequent extractions. "Waring Blendor" indicates that the sample was ground 1 minute at high speed before each extraction. Centrifuged at 800 × g to separate miscella.

TABLE IV
EXTRACTION OF SESAME SEEDS

| Screen Size, mm[a] | Moisture Adjusted to, %[b] | Extraction Conditions[c] | Miscella Clarity | Residual Oil, % d.b. |
|---|---|---|---|---|
| 6.4 | 19.2 | Regular | Clear | 5.0 |
|  | 19.2 | With Grinding | Clear | 3.1 |
| 4.8 | 15.7 | With Grinding | Very Slightly Cloudy | 0.9 |
|  | 22.1 | With Grinding | Clear | 3.6 |
|  | 27.2 | With Grinding | Clear | 2.4 |
| 3.1 | 19.3 | Regular | Very Slightly Cloudy | 4.1 |
|  | 19.3 | With Grinding | clear | 2.9 |

[a]Cleaned sesame seeds ground once through a 12.5-cm stainless steel hammer mill fitted with indicated screen.
[b]Water mixed carefully into ground sesame and equilibrated at 4° C. for 16 hours.
[c]For the "regular" extraction, mixed hydrated sesame with hexane for 30 seconds at high speed in 1-quart Waring Blendor, then centrifuged at 800 × g for 1 second. In 6 subsequent extractions, mixed hexane with residue by hand before centrifugation. In the extractions "with grinding", the residue was mixed with hexane for 1 minute in Waring Blendor at high speed each time before centrifugation.

EXAMPLE 2

Extraction of Peanut Oil

Blanched peanuts containing sufficient added moisture to bring the moisture content to between about 12% and 17% by weight were ground through an Urschel Laboratories Model 1700 COMITROL mill made by the Urschel Laboratories Company, Valparaiso, Ind., using various heads with the impellor rotating at a speed of 9500 rpm. The moist, ground nuts were then extracted with hexane according to the procedure given in Example 1. The results are given in Table V. These results show that the Urschel mill is effective in preparing moist, oily seeds, such as peanuts, for the process of this invention. The miscellas were all clear when the moisture content of the ground seeds was from about 11.6% to about 17.3% by weight. When a comparative test was run using ground seeds with 4% moisture, the miscella was cloudy due to the presence of fines.

TABLE V
EXTRACTION OF PEANUTS

| Urschel Mill Head | Moisture, % | Miscella Clarity | Residual Oil[a] % d.b. |
|---|---|---|---|
| 160084-5 | 16.4 | Clear | 1.0 |
| 160084-5 | 11.6[b] | Clear | 1.4 |
| 180084-2 | 17.3 | Clear | 0.6 |
| 180084-2 | 17.3 | Clear | 0.2[c] |
| 180084-2 | 12.6[b] | Clear | 0.8 |

[a]Mixed 50 grams ground peanuts (53.5% oil) in 250 ml hexane in 1-pint Waring Blendor for 10 seconds, low speed, centrifuged for 1 second at 1500 rpm (500 × g), repeated extractions with 200 ml hexane for total of 7 extractions.
[b]Dried above sample to about 4% moisture under vacuum at room temperature, rehydrated to 12% before extraction.
[c]Extracted as in [a] but treated for 1 minute in 1-pint Waring Blendor at high speed for first 4 extractions.

EXAMPLE 3

Extraction of Babassu Kernels

Babassu kernels were ground in the Urschel mill described in Example 2 using a 200084-1 head. Samples of kernels having from 9.5% to 12.4% moisture were then extracted with hexane or iso-octane. The results are given in Table VI. These show that satisfactory extraction and a clear miscella were obtained when the moisture content was from about 9.5% to about 12.4%. They also show that somewhat better extraction is achieved when the extraction is carried out at an elevated temperature. When a comparative test was run using ground kernels with a moisture content of 6.6%, the miscella was cloudy due to the presence of fines.

TABLE VI
EXTRACTION OF BABASSU KERNELS

| Extraction Temp, °C. | Moisture Content, % | Miscella Clarity | Residual Oil, % d.b. |
|---|---|---|---|
| 25 | 12.4 | Clear | 1.4 |
| 65[a] | 9.5 | Clear | 1.0 |
| 82[b] | 9.5 | Clear | 0.7 |

[a]Hexane slurry held near boiling point for 15 minutes, then centrifuged at 800 × g for 1 second. In subsequent extractions, brought slurry to a boil before centrifugation.
[b]As above, but used iso-octane as a solvent. Boiling point shown is that of the azeotrope with water.

Thus, it is apparent that there has been provided, in accordance with the invention, a process for the total immersion extraction of oil from high oil-bearing seeds that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to include all such alternatives, modifications, and variations as set forth within the spirit and scope of the appended claims.

What is claimed is:

1. A total immersion process for the extraction of oil from high oil-bearing seeds without contaminating the miscella with fines, consisting essentially of the steps of:
   (a) dispersing finely-divided high oil-bearing seeds containing from about 10% to about 25% water by weight, in an oil solvent to give a solid-solvent dispersion;
   (b) extracting oil from the solid-solvent dispersion with additional oil solvent;
   (c) separating the oil solvent with oil from insoluble material; and
   (d) recovering the oil from the oil solvent with oil.

2. The process of claim 1 wherein the solid-solvent dispersion is subjected to a further comminuting step before the oil is extracted.

3. The process of claim 1 or 2 wherein the oil solvent with oil is separated from the insoluble material by means of hydrocyclones.

4. The process of claim 1 or 2 wherein the high oil-bearing seeds are selected from the group consisting of babassu kernels, flaxseed, peanuts, rapeseed, sesame seeds, and sunflower seeds.

5. The process of claim 1 or 2 wherein the oil solvent is hexane.

* * * * *

UNITED STATES PATENT AND TRADEMARK OFFICE
CERTIFICATE OF CORRECTION

PATENT NO. : 4,325,882
DATED : April 20, 1982
INVENTOR(S) : Robert A. Reiners

It is certified that error appears in the above-identified patent and that said Letters Patent are hereby corrected as shown below:

Column 3, line 4, delete "Blender" and insert --Blendor--.

Column 4, line 60, delete superscript "9" and insert --$a$--.

Column 4, line 68, delete "eight" and insert --eighth--.

Column 5, line 2, under Table II insert title --EXTRACTION OF CANOLA SEED--.

Column 5, line 51, delete "clear" and insert --Clear--.

Signed and Sealed this

Twenty-fourth Day of August 1982

[SEAL]

*Attest:*

GERALD J. MOSSINGHOFF

*Attesting Officer*     *Commissioner of Patents and Trademarks*